Sept. 5, 1961 T. W. HORN 2,998,871
POWER TRANSMITTING DRIVE EMBODYING FRICTION CLUTCH
Filed Oct. 21, 1959
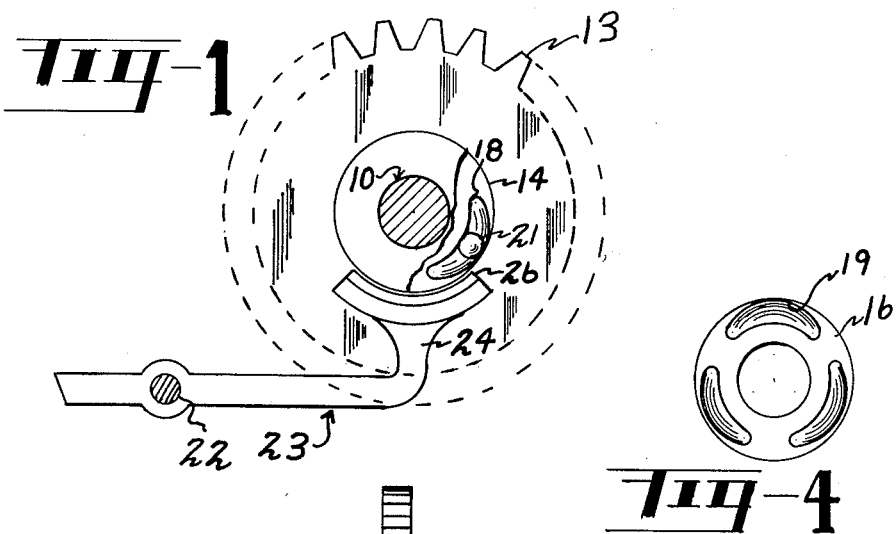
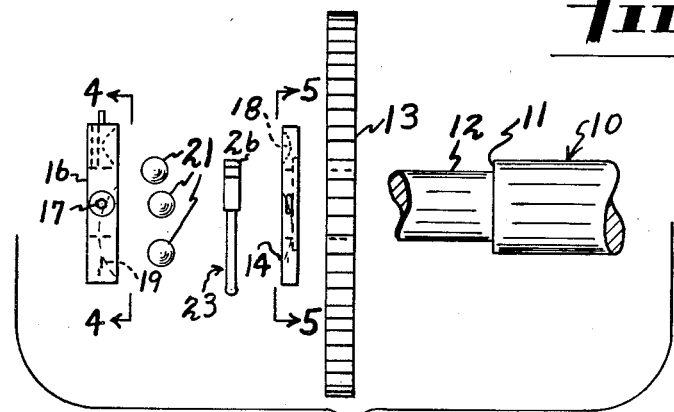
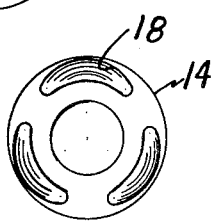
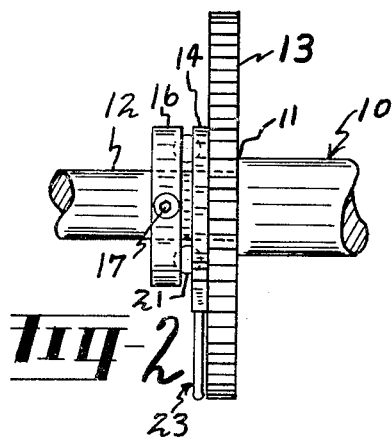
INVENTOR.
Thurman W. Horn
BY Jennings, Carter & Thompson
Attorneys United States Patent Office 2,998,871
Patented Sept. 5, 1961

2,998,871
POWER TRANSMITTING DRIVE EMBODYING FRICTION CLUTCH
Thurman W. Horn, % Carbometer Inc., P.O. Box 671, Anniston, Ala.
Filed Oct. 21, 1959, Ser. No. 847,725
3 Claims. (Cl. 192—17)

This invention relates to a power transmitting drive and more particularly to such apparatus which shall embody means effective to engage a friction clutch associated therewith in such a manner as to bring about connection between the parts for rotation in different directions and is a continuation-in-part of my co-pending application Serial No. 532,617, filed September 6, 1955, now Patent No. 2,915,156 issued December 1, 1959, and entitled "Power Transmitting Drive Embodying Friction Clutch."

In many instances in mechanics, especially in transmitting fractional horsepower loads, it often is desirable to lock a gear, pulley or wheel to a shaft upon relative rotation of the shaft or gear in either direction and at the same time to provide means for selectively freeing the gear for relative rotation in either direction. Also, it is desirable to lock the shaft and gear together when the power is supplied to the shaft to rotate the same in either direction and yet to provide means to free the gear for rotation in either direction when power is applied to the gear. My invention has particular application in the construction of such devices as taxicab meters. As is well known, taxicab meters register the passage of time as well as the passage of miles. Such apparatus generally embodies a shaft which is driven from the vehicle and clock means which in turn drives the recording portion of the meter during those times when the vehicle is standing still. It is desirable, therefore, to have the clock commence to drive the indicating mechanism immediately upon the vehicle coming to rest, without loss of time. My invention is particularly adapted for this purpose.

In view of the foregoing, an object of my invention is to provide apparatus having the foregoing features in which the element to be driven, such as the gear, is mounted freely on a supporting, driving shaft and is locked thereto through the medium of a friction clutch which is adapted operatively to engage the driven element, there being a wedge type connector having a thrust element secured to the shaft and disposed upon opposite relative rotation of the driven member and the shaft to engage the friction clutch, thereby to lock the driven element to the shaft.

Another object is to provide a power transmission drive in which a driven element, such as a gear, is mounted freely on a driving element, such as a shaft, there being a friction clutch having a part freely rotatable on the shaft and freely rotatable relative to the gear, together with thrust means on the shaft effective upon engagement with the clutch part frictionally to lock the latter both to the gear and shaft, thereby locking the gear and shaft together, regardless of the direction in which the gear is driven by the shaft.

Another object is to provide apparatus of the character designated in which the gear and shaft may be locked together as described simply by releasing the braking action on the clutch part even though the driving element is the driven one, or vice versa.

Apparatus illustrating features of my invention is shown in the accompanying drawing forming a part of this application, in which:

FIG. 1 is a fragmental side elevational view of my improved apparatus, certain of the parts being broken away and in section, and showing in diagrammatic manner means for braking the friction clutch element;

FIG. 2 is an end elevational view of the device shown in FIG. 1, partly broken away and in section;

FIG. 3 is an exploded view showing the several parts of the apparatus of FIGS. 1 and 2;

FIG. 4 is a detail view taken generally along the line 4—4 of FIG. 3 and showing the arcuate grooves or socket in the face of the thrust member; and, FIG. 5 is a view similar to FIG. 4 and taken generally along line 5—5 of FIG. 3 and showing the complementary arcuate grooves or sockets in the face of the friction clutch element.

Referring now to the drawings for a better understanding of my invention, I show a shaft 10 having an abutment or shoulder 11 thereon which is disposed adjacent a reduced diameter portion 12. Mounted for rotation on the reduced diameter portion 12 is a gear 13 which is adapted to bear against the abutment or shoulder 11, as shown in FIG. 2.

Mounted next adjacent the gear 13, on the face thereof opposite the abutment 11, is a friction clutch element indicated generally by the numeral 14. The clutch element is mounted for free rotary movement on the reduced diameter portion 12 of the shaft 10 and has a face which frictionally engages the side of the gear 13 as indicated.

Spaced axially from the clutch element 14 is a thrust member indicated generally by the numeral 16. The thrust member 16 is made fast to the reduced diameter portion 12 of the shaft 10 by means of a set screw 17.

The adjacent faces of the clutch element 14 and the thrust member 16 are provided with arcuate grooves 18 and 19, respectively. The grooves are deepest adjacent the mid-portions and become gradually shallower from the mid-portion towards their ends. Adapted to fit in the grooves 18 and 19 are steel balls 21. The balls 21 are of such diameter relative to the minor depths of the grooves 18 and 19 that when the parts 14 and 16 rotate slightly relative to each other, the parts are locked together through the balls as will appear. It will be noted that the combined depth of each set of grooves 18 and 19 adjacent the mid-portions thereof is slightly greater than the diameter of the balls 21.

As pointed out hereinabove, the object of my invention is to provide a drive in which the gear 13 is normally locked to the shaft 10, regardless of the direction in which the shaft is rotated and yet, to provide means which shall be effective to free the gear 13 for rotation in either direction when power is applied to the gear as distinguished from applying power to the shaft. To this end I pivotally mount on a pivot point 22 an arm 23. The arm 23 has an upwardly extending portion 24 which is positioned beneath the clutch element 14. An arcuate section of friction material 26 is provided on the upper end 24 so that upon upward movement of the end portion 24 the friction material 26 contacts the periphery of the clutch element 14. Accordingly, the clutch element 14 is held against rotation on the shaft 10.

From the foregoing description it will be seen that when the shaft 10 is rotated in either direction the inertia of the gear 13 and the other parts causes the balls to wedge in the shallow parts of the sockets or grooves 18 and 19, locking the gear 13 to the shaft 10 through clutch member 14, balls 21 and thrust member 16. This is true also in the event power is applied to the gear 13, in either direction, instead of power being applied to the shaft 10 in either direction. However, if it is desired to free gear 13 for rotation independently of shaft 10, the friction material 26 is brought into engagement with the periphery of the clutch element 14. This braking action holds clutch element 14 stationary, causing balls 21 to remain in the deep portions of the sockets 18 and 19, thus freeing gear 13 for independent rotation relative to the other parts. My improved power transmitting drive thus provides means whereby the gear 13 or any similar member is always readied for rotation in the same direction that the shaft 10 rotates, even though the shaft be stationary and power applied to the gear 13. Accordingly, immediately rotation of the shaft 10 is stopped, assuming that suitable mechanism is provided for rotating the gear 13, the gear 13 is continued in its rotary motion without delay by engagement of the friction material 26 with the clutch element 14.

From the foregoing description, it will be seen that I have devised an improved power transmission means. My invention is particularly useful where it is desired immediately to pick up the rotation of a gear from a power source applied to the gear, upon stopping of a shaft which previously has been rotating the gear, without delay. It will be understood that the mechanism finally to be driven may be connected in various ways to the gear 13, such as by a pinion which is in mesh with the gear 13 or by operatively connecting the mechanism to the face of the gear in a manner well understood in the art. In actual practice, I have found that my invention is satisfactory in every respect and is particularly adapted for use in association with certain driven and driving parts in taxicab meters and similar devices. It will be apparent, however, that my invention has various other uses.

While I have shown my invention in but one form, it will be obvious to those skilled in the art that it is not so limited but is susceptible of various changes and modifications without departing from the spirit thereof, and I desire, therefore, that only such limitations shall be placed thereupon as are specifically set forth in the appended claims.

What I claim is:

1. In power transmitting apparatus, a shaft having an abutment thereon, a gear or the like mounted freely on said shaft adjacent said abutment and having one face in contact with the abutment, a thrust member secured to said shaft for rotation therewith and spaced axially from said abutment, a friction clutch element freely mounted on said shaft between said thrust member and said gear, said clutch element being in frictional contact with said gear and being spaced from the thrust member, wedge locking means interposed between said thrust member and said clutch element and adapted for forcing said clutch element along said shaft into frictional locking engagement with said gear and for locking said freely mounted clutch element for rotation with said thrust member upon relative rotation of said thrust member and said clutch element in either direction of rotation, means to rotate said gear, relative rotation between said shaft and said gear forcing the clutch element through said locking means into frictional locking engagement with said gear whereby said shaft and gear are operatively connected in driving relation to each other, and brake means operatively associated with said clutch element and effective when applied to retard rotation of said clutch element to thereby render ineffective the clutch engaging action of said wedge means whereby the gear may be rotated freely on said shaft.

2. In power transmitting apparatus, a shaft having an abutment thereon, a gear or the like mounted freely on said shaft adjacent said abutment and having one face in contact with the abutment, a thrust member secured to said shaft for rotation therewith and spaced axially from said abutment, a friction clutch element freely mounted on the shaft between said thrust member and said gear, said clutch element being in frictional contact with said gear and being spaced from the thrust member, there being complementary cam shaped sockets in the adjacent faces of said thrust member and said clutch element, said sockets comprising grooves having deep middle portions and shallow end portions, a ball in each of said sockets of a diameter relative to the depth of the sockets to force said clutch element along said shaft into frictional locking engagement with said gear and to lock said freely mounted clutch element for rotation with said thrust member upon rotation of the thrust member and clutch element relative to each other, means to rotate said gear, relative rotation between said shaft and said gear in either direction of rotation forcing the clutch element axially through said thrust member and said balls and cam shaped sockets into frictional locking engagement with said gear whereby said shaft and gear are operatively connected in driving relation to each other, and brake means operatively associated with said clutch element and effective when applied to prevent rotation of said clutch element relative to said thrust member to thereby render ineffective the clutch engaging action of said balls and cam shaped sockets, whereby the gear may be rotated freely on said shaft.

3. Power transmitting apparatus as defined in claim 2 in which the brake means comprises a member mounted for movement toward and away from the periphery of the clutch element, and an arcuate section of friction material carried by said member in position to engage the periphery of said clutch element upon movement of said member toward said clutch element.

References Cited in the file of this patent

UNITED STATES PATENTS

| | | |
|---|---|---|
| 2,299,621 | Giffen et al. | Oct. 20, 1942 |
| 2,449,893 | Gilman | Sept. 21, 1948 |
| 2,825,434 | Smitzer | Mar. 4, 1958 |
| 2,888,115 | Knittel | May 26, 1959 |